United States Patent Office 3,540,938
Patented Nov. 17, 1970

3,540,938
ELECTROLYTE COMPRISING A NON-AQUEOUS SOLVENT AND ELECTROCHEMICAL GENERATOR HAVING SUCH ELECTROLYTE
Jean Paul Gabano, Poitiers, France, assignor to Societe des Accumulateurs Fixes et de Traction (Société Anonyme), Romainville, France, a company of France
Filed Nov. 4, 1968, Ser. No. 773,015
Claims priority, application France, Nov. 15, 1967, 128,379
Int. Cl. H01m *43/06*
U.S. Cl. 136—155      17 Claims

ABSTRACT OF THE DISCLOSURE

An electrolyte with non-aqueous solvent unreactive towards electrodes of an electrochemical generator, including a solute to insure adequate conductivity. The solvent comprises a halogen derivative of an organic ester whose formulation is XR—COOR' in which X is a halogen, R is a radical of the form $C_nH_{2n}$, R' is a radical of the form $C_pH_{2p+1}$, $n$ is an integer equal to 0 or 1 or 2 and $p$ is an integer equal to 1 or 2. The halogen is preferably chlorine or bromine, the solvent is preferably either methyl or ethyl bromo- or chloroformate. A salt such as lithium chloroaluminate is dissolved in the solvent when the latter is a chlorine derivative or lithium bromoaluminate when the solvent is a bromine derivative. The concentration of said salt in the solvent ranges from between 1 and 3 moles per liter. The electrochemical generator utilizing this electrolyte is provided with negative electrodes containing highly reactive metals such as alkali metals and especially lithium. The positive electrodes are mainly of cuprous chloride and copper when the solvent is a chlorine derivative or are sintered copper plates from which cuprous chloride is formed by positive polarization in the described electrolyte.

RELATED APPLICATIONS

Related applications Ser. No. 693,320, filed Dec. 26, 1967, Ser. No. 695,311, filed Dec. 26, 1967, and Ser. No. 718,974, filed Mar. 21, 1968, are copending.

BRIEF SUMMARY OF INVENTION

The present invention primarily relates to an improved electrolyte containing a non-aqueous solvent to be used in electrochemical cells, particularly cells provided with negative electrodes comprising highly reactive metals such as alkali metals and especially lithium.

It is known that in recent years great interest has been taken in electrochemical cells capable of delivering high output of electrical energy, using particularly highly reactive metals such as alkali metals and especially lithium. However, if such metals constitute the active material of the negative electrodes of the cell, it cannot be associated with aqueous electrolyte which is attacked by the said metals.

Therefore, attempts have been made to develop electrolytes with a non-aqueous solvent that is unreactive towards the electrodes and which comprises also a solute to ensure its adequate conductivity.

The selection of such a solvent is controlled by conditions related to the conductivity of the electrolyte, its lack of reactivity towards both positive and negative electrode material and its ability to dissolve the products of the electrochemical discharge reaction, the accumulation of which would cause electrode polarization.

Moreover, when a cell operates as a secondary cell, i.e., one capable of being recharged after being discharged, the deposition or precipitation of the said products of the electrochemical reaction withdraws them from the reaction system and generally keeps them inactive to the recharging reactions which are required to regenerate the active materials to a charged state.

Among other solvents a particular kind, viz esters, have been studied. It has been found that whereas the required ability for dissolving either the salts needed to give the required conductivity to the electrolyte solution or the products resulting from discharge electrochemical reactions, at least as far as esters comprising a relatively low number of carbon atoms are concerned (methyl or ethyl formates or acetates, for example), can be obtained, but on the other hand, such solvents were not inert towards the electrodes.

In particular, lithium is attacked by such esters, at least when in finely divided shape. Whereas lithium can be provided in compact form (such as rolled sheets) at the time of initial assembly of the cells, thereafter and subsequent to the first discharge, as soon as the first recharge occurs, the lithium takes on a very finely divided form so that its attack by the esters constituting the solvent of the non-aqueous electrolyte occurs very quickly.

Thus, methyl formate ($HCOOCH_3$) can be used in certain conditions in primary cells when the attack of lithium in massive form is relatively slight. However, the storage of such cells is not possible since the attack of lithium by methyl formate is not negligible.

Among the drawbacks of the above-mentioned esters, it must also be noted that some esters tend to dissolve the cuprous chloride which can advantageously be used in the positive electrode.

An object of the present invention is to avoid the said drawbacks by the use of an electrolyte comprising a solvent constituted by a halogen derivative of an organic ester of general formulation:

$$XR—COOR'$$

where

X is a halogen
R is a radical of the type $C_nH_{2n}$
R' is a radical of the type $C_pH_{2p+1}$, $n$ being an integer equal to 0 or 1 or 2 and $p$ an integer equal to 1 or 2.

It has been found that when the ester contains at least one halogen substituted for at least one hydrogen in the acyl radical of the ester, the lithium used in the electrochemical generator is not attacked whether it is finely divided or not. In other words, it appears that if the mole of the non-halogenated ester contains at least one hydrogen it reacts with the lithium, whereas when the said hydrogen has a halogen substituted for it the ester becomes inert towards lithium.

Moreover, in such conditions the metal halide used in the positive electrode remains insoluble.

Advantageously, the halogen X is chlorine or bromine. Among halo-esters, methyl chloroformate $$(ClCOOCH_3)$$

also called methyl chlorocarbonate and the ethyl chloroformate ($ClCOOC_2H_5$) have been used satisfactorily. Somewhat less favorable performances have been given by methyl chloroacetate ($CH_2ClCOOCH_3$) which tends to dissolve the active material of the positive electrode.

Good results have also been obtained with bromoesters such as a methyl bromocarbonate ($BrCOOCH_3$) but the substitution of brome for chlorine leads to solvents having a higher specific gravity and is generally less advantageous than the use of chlorine derivatives.

In order to give an adequate conductivity to the electrolyte, a salt is dissolved in the solvent, the said salt being advantageously a halogenoaluminate of the alkali metal used in the negative electrode. For example, with the chloro solvents according to the invention, a lithium aluminum halide, e.g. lithium chloroaluminate (LiAlCl$_4$)

can advantageously be chosen, when lithium is the alkaline metal of the negative electrode.

When the solvents are bromine derivatives instead of being chlorine derivatives, the added salt is another lithium aluminum halide such as a bromine salt, e.g. lithium bromoaluminate (LiAlBr$_4$).

According to a preferred embodiment, the active material of the positive electrode is constituted by cuprous chloride CuCl when chlorine derivative solvents are concerned. The cuprous chloride can be formed in situ by positively polarizing an electrode made of sintered copper, in the electrolyte according to the invention, the reaction being:

$$2Cu + 2Cl^- \rightarrow Cu_2Cl_2 + 2e^-$$

Cl$^-$ coming from the lithium chloroaluminate.

Other objects and features of the invention include the provision of an electrochemical generator using such electrolyte.

Further objects and features of the invention will become apparent from the following description, taken in conjunction with the accompanying drawings given as example and in which.

DETAILED DESCRIPTION

As already stated, the conductivity of the electrolyte solution of the solvent and the salt used according to the invention is a function of the concentration of the salt.

Figure 1:
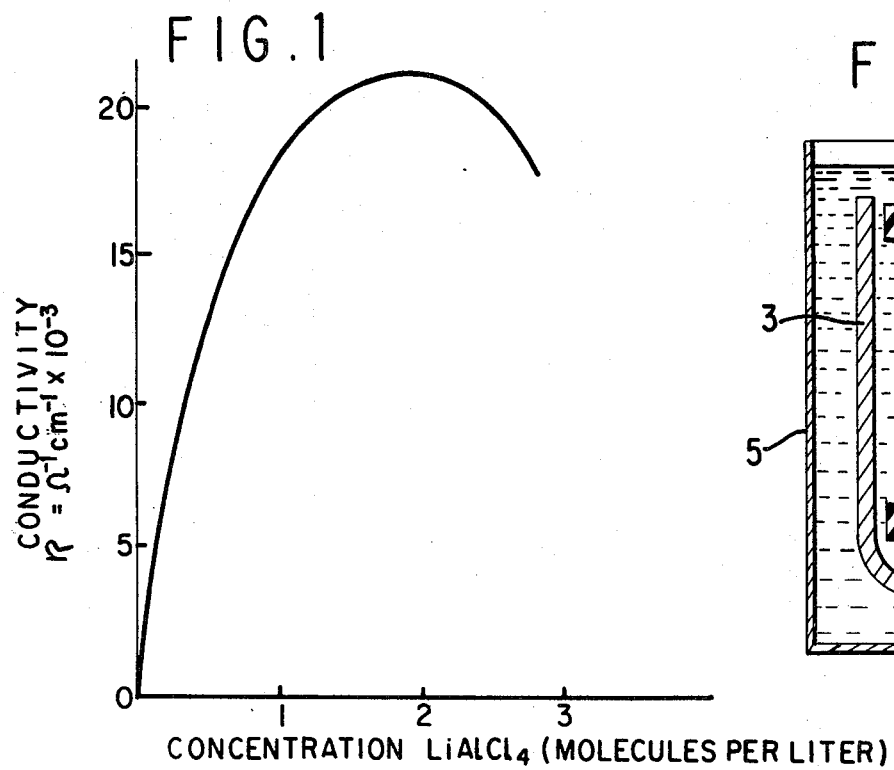
FIGURE 1 shows a curve wherein the conductivity of an electrolyte solution according to the invention is plotted as ordinates against the concentration of salt (lithium chloroaluminate) in the solvent (methyl chloroformate in the given example) as abscissae.

Thus, in FIGURE 1, the conductivity of an electrolyte solution obtained by dissolving lithium chloroaluminate in methyl chloroformate is plotted against the concentration of the salt in the solvent in moles per liter. It may clearly be seen that the highest conductivity corresponds to concentrations in the range of 1 to 3 moles of lithium chloroaluminate per liter of methyl chloroformate, with a maximum value reaching $20 \times 10^{-3} \Omega^{-1}_x$ cm.$^{-1}$.

Figure 2:
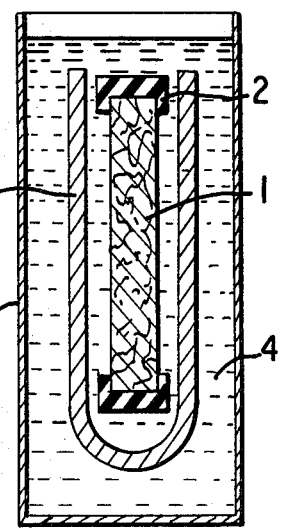
FIGURE 2 is a diagrammatical cross-section of an electrochemical cell according to the invention.

FIGURE 2 diagrammatically shows a storage cell according to the invention, comprising a positive electrode 1 constituted by a disk of sintered copper held apart from the negative electrode 3 constituted by a U-shaped sheet of lithium enveloping the disk 1, by an annular-shaped rim piece 2 made, for example, of "Teflon" or other insulating material. This assembly is immersed in a container 5 filled with an electrolyte 4 according to the invention; in the illustrated example, the electrolyte is constituted by a molar solution of lithium chloroaluminate in methyl chloroformate. If desired, in certain circumstances, other metals such as silver may be substituted for the copper of the positive electrode.

Figure 3:
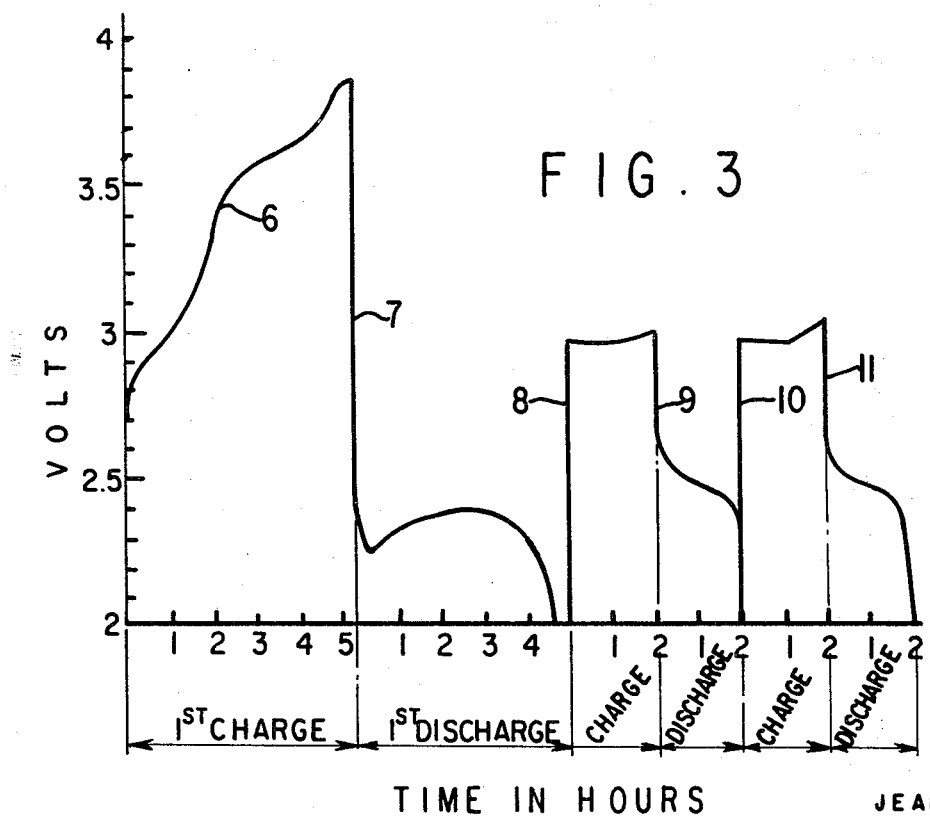
FIGURE 3 shows charging and discharging curves of the cell shown in FIGURE 2, the voltage at the cell terminals being plotted as ordinates and the duration of charge or discharge being plotted as abscissae.

In the above-described example corresponding to the operating characteristics shown in FIGURE 3, the sintered copper disk had a diameter of 21 mm. and a thickness and porosity such that its weight was 20 g. per dm.$^2$.

A first charge is given to the positive electrode 1 of the cell illustrated in FIGURE 2, at a rate of 4 ma./dm.$^2$, so that the charging current is 28 ma., since the positive electrode is worked on both sides, their area being about 7 cm.$^2$, taking into account the edges masked by rim 2. After a charge of 5 hours and 20 minutes (FIGURE 3), the quantity of transformed copper was 51% of the copper constituting the disk 1; at this time, the charge was stopped. The copper remaining in the disk acts as a support and as a current collector. The necessary chlorine ions are supplied from the lithium chloroaluminate whose concentration does not substantially change since it is largely in excess.

FIGURE 3 shows at 6 the charging curve corresponding to the formation of cuprous chloride in the positive electrode. Curve 7 shows the subsequent discharge cycle of the cell. Curves 8, 9, 10 and 11 respectively show the successive charge, discharge, charge and discharge cycles. All rates for discharging and charging are fixed at a constant current density 4 ma./cm.$^2$. Data are summarized in the table hereunder:

| Curves | 6–7 | 8–9 | 10–11 |
|---|---|---|---|
| Charge, ma./h | 150 | 56 | 56 |
| Discharge, ma./h | 133 | 56 | 55 |
| Efficiency, percent | 88.73 | 100 | 97.8 |

The above table shows that the electrolyte according to the invention is quite suitable for a secondary cell having a negative electrode made of lithium.

It must be noted that the subsequent cycles of charge and discharge performed by the cell shown in FIG. 2 had curvature characteristics substantially identical to the first cycles shown in FIG. 3.

While specific embodiments of the invention have been disclosed, variations in practice within the scope of the appended claims are possible and are contemplated. There is no intention, therefore, of limitation to the exact abstract or disclosure herein presented. If desired, cupric chloride may be substituted for cuprous chloride at the positive electrode.

What is claimed is:

1. An electrolyte for electrochemical generator utilizing highly reactive alkali metals in its negative electrode and other metals for the positive electrode, comprising a non-aqueous solvent which is a halogen derivative of an organic ester whose formulation is XR—COOR' wherein X is a halogen, R is a radical $C_nH_{2n}$, R' is a radical $C_pH_{2p+1}$, $n$ is an integer ranging from 0 to 2 and $p$ is an integer ranging from 1 to 2, said solvent including a salt dissolved therein and wherein said salt is selected from the group consisting of lithium aluminum halides comprising lithium bromoaluminate and lithium chloroaluminate.

2. An electrolyte according to claim 1, wherein said halogen is selected from the group consisting of chlorine and bromine.

3. An electrolyte according to claim 1, wherein said halogen is selected from the group consisting of chlorine and bromine, said solvent includes said salt dissolved therein, and said solvent is selected from the group consisting of methyl bromoformate, ethyl bromoformate, methyl chloroformate and ethyl chloroformate.

4. An electrolyte according to claim 3, wherein said salt in the solvent has a concentration ranging from 1 to 3 moles per liter.

5. An electrolyte according to claim 1, wherein the solvent includes a salt dissolved therein which comprises a compound of a halogen and highly reactive alkali metal.

6. An electrochemical generator comprising a negative electrode of highly reactive alkali metal and a positive electrode of cuprous material and a non-aqueous electrolyte which is a halogen derivative of an organic ester whose formulation is RX—COOR' wherein X is a halogen, R is a radical $C_nH_{2n}$, R' is a radical $C_pH_{2p+1}$, $n$ is an integer ranging from 0 to 2 and $p$ is an integer ranging from 1 to 2.

7. An electrochemical generator according to claim 6, wherein said halogen is selected from the group consisting of chlorine and bromine.

8. An electrochemical generator according to claim 6, wherein said halogen is selected from the group consisting of chlorine and bromine, said solvent includes a salt dissolved therein, said solvent being selected from the group consisting of methyl bromoformate, ethyl bromoformate, methyl chloroformate and ethyl chloroformate, and wherein said salt is selected from the group consisting of lithium aluminum halides comprising lithium bromoaluminate and lithium chloroaluminate.

9. An electrochemical generator according to claim 8, wherein said salt in the solvent has a concentration ranging from 1 to 3 moles per liter.

10. An electrochemical generator according to claim 6, wherein the solvent includes a salt dissolved therein which comprises a compound of the halogen and the alkali metal of the negative electrode.

11. An electrochemical generator according to claim 6, wherein said halogen is selected from the group consisting of chlorine and bromine and wherein when said solvent is a chlorine derivative and said positive electrode is cuprous chloride.

12. An electrochemical generator according to claim 6, wherein said halogen is selected from the group consisting of chlorine and bromine and said positive electrode is a sintered copper plate from which cuprous chloride is formed by positive polarization in the said electrolyte.

13. An electrochemical generator according to claim 6, wherein the alkali metal of said negative electrode is lithium.

14. An electrochemical generator comprising a casing, a copper positive electrode, a lithium negative electrode, insulative means for spacing the electrodes from each other and a non-aqueous electrolyte within the casing which is a halogen derivative of an organic ester whose formulation is XR—COOR′ wherein X is a halogen, R is a radical, $C_nH_{2n}$, R′ is a radical $C_pH_{2p+1}$, $n$ is an integer ranging from 0 to 2 and $p$ is an integer ranging from 1 to 2.

15. An electrochemical generator according to claim 14 wherein said positive electrode is a disk of sintered copper, said negative electrode is a substantially U-shaped sheet of lithium enveloping said disk, and said means for spacing the electrodes comprises an annular rim of insulative material mounted on said disk, said electrodes being immersed in said non-aqueous electrolyte within said casing.

16. An electrochemical generator according to claim 15 wherein said non-aqueous electrolyte is a molar solution of lithium chloroluminate in methyl chloroformate in the range of 1 to 3 moles of lithium chloroformate per liter of methyl chloroformate.

17. An electrochemical generator according to claim 15 wherein said disk has a diameter of approximately 21 mm. and has a porosity such that its weight is approximately 20 g. per $dm.^2$.

References Cited
UNITED STATES PATENTS

| | | | |
|---|---|---|---|
| 3,393,092 | 7/1968 | Shaw et al. | 136—155 XR |
| 3,413,154 | 11/1968 | Rao | 136—153 XR |

DONALD L. WALTON, Primary Examiner